May 9, 1939.  R. W. HALL  2,157,289
CONVEYER CHAIN
Filed April 28, 1938   2 Sheets-Sheet 1
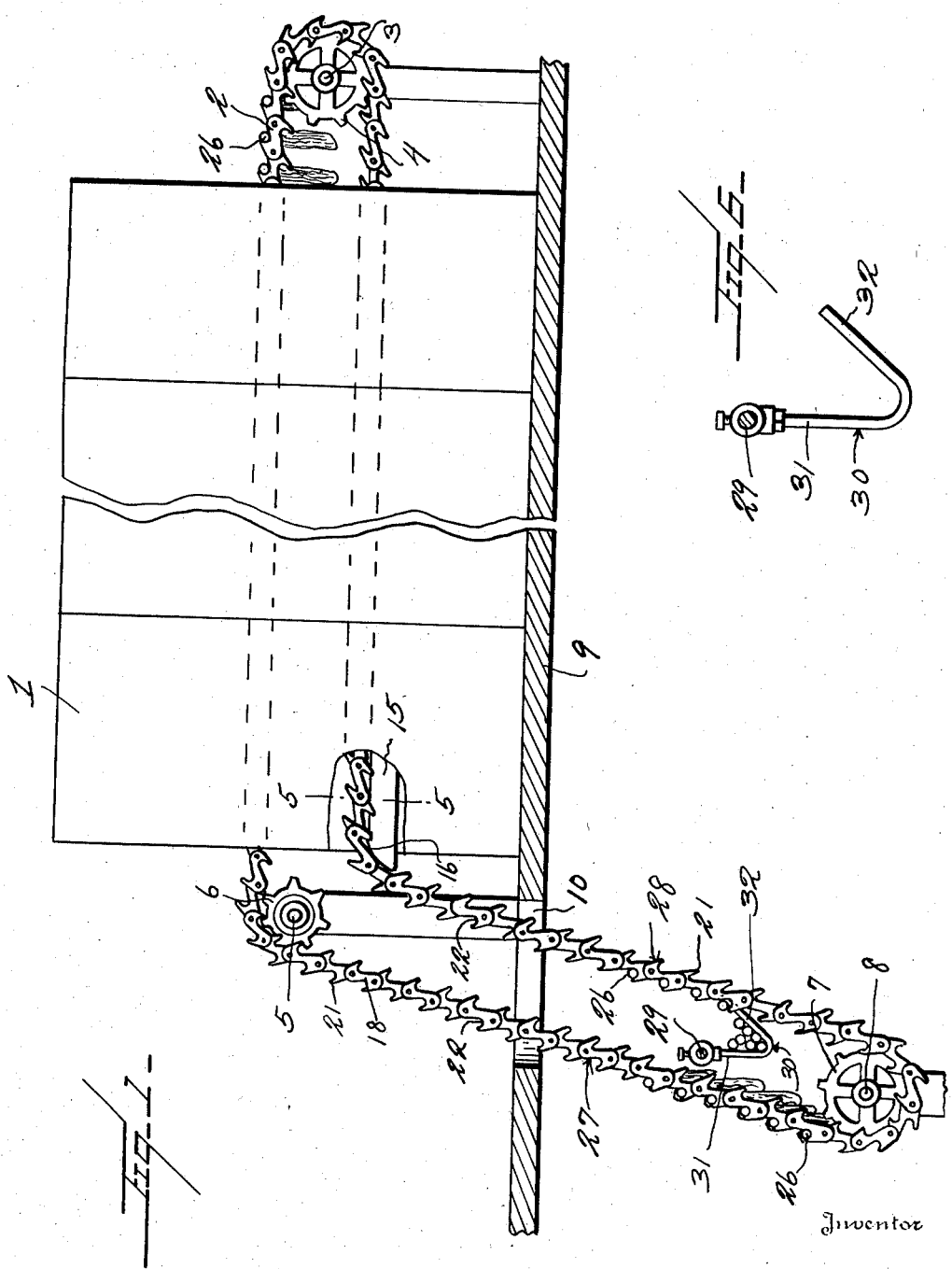

May 9, 1939.  R. W. HALL  2,157,289
CONVEYER CHAIN
Filed April 28, 1938  2 Sheets-Sheet 2
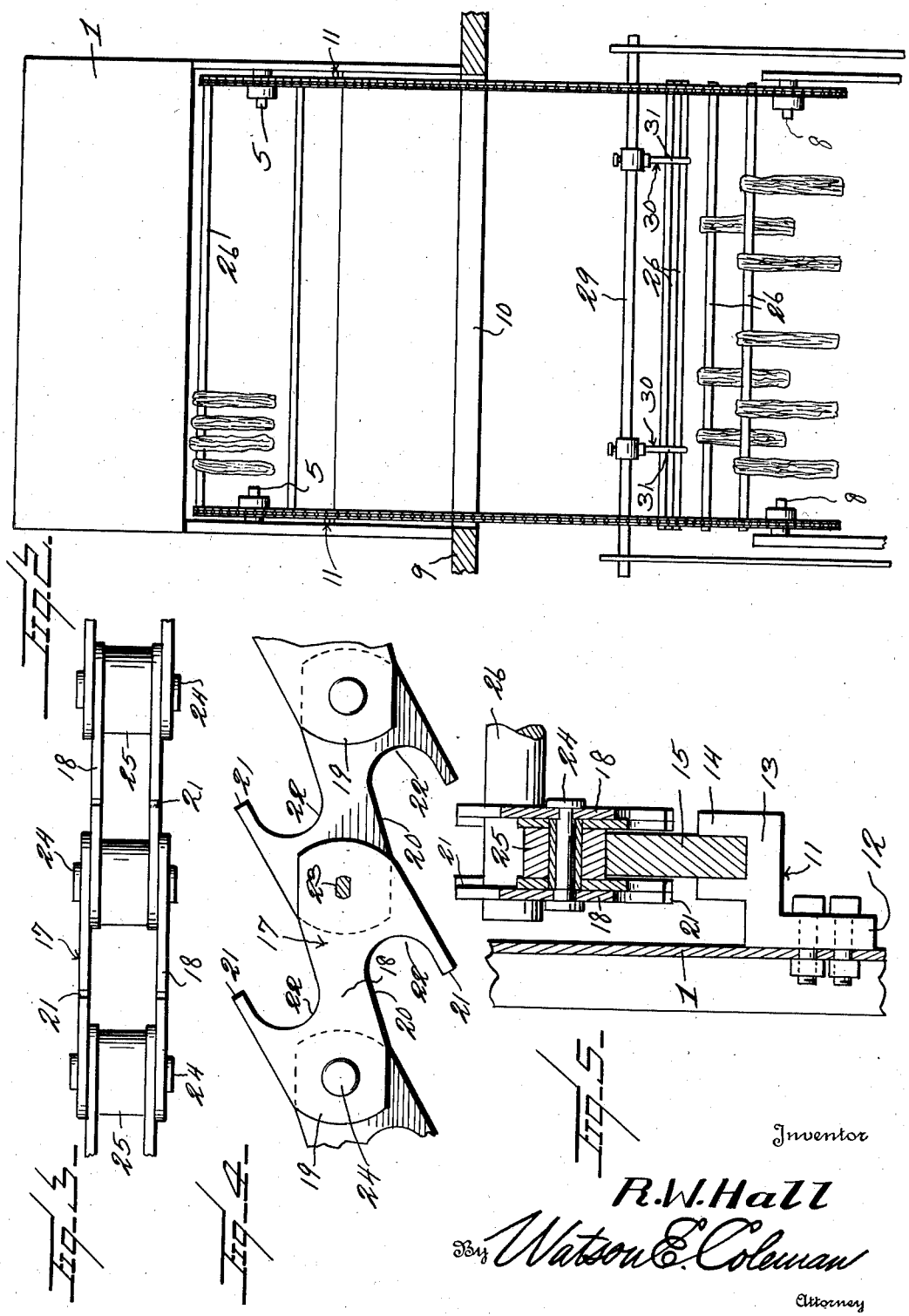
Inventor
R.W.Hall
By Watson E. Coleman
Attorney Patented May 9, 1939

2,157,289

UNITED STATES PATENT OFFICE 2,157,289

CONVEYER CHAIN

Richard W. Hall, Graniteville, Mass., assignor to C. G. Sargent's Sons Corporation, Graniteville, Mass., a corporation of Massachusetts Application April 28, 1938, Serial No. 204,896

7 Claims. (Cl. 198—131)

This invention relates to conveyer structures and pertains particularly to improvements in conveyer chains.

The present invention has for its primary object to provide an improved conveyer chain which is designed to convey material carrying bars or poles upon the top and bottom runs when the chain is employed as an endless unit in a conveyer structure whereby such material carrying bars or poles may be passed in one direction through a dryer or other structure to a discharge point and returned on the same conveyer to the starting point to be again used for carrying material through said structure.

Another object of the invention is to provide an improved conveyer chain which is so designed that, when set up in endless form, material carrying poles or bars may be easily and quickly connected with the top or bottom runs of the chain to extend transversely thereof and be supported thereon for transportation in either of two directions, as desired.

Still another object of the invention is to provide an improved conveyer chain which is so designed that when set up in multiple to form a conveyer structure for the carriage of material supporting bars or poles, a novel automatic pole removing means may be employed for lifting the poles from the conveyer as they are carried in one direction past a selected station, without interrupting the continuous movement of the conveyer and so that such poles may be loaded with material and replaced for transportation by the conveyer in the opposite direction.

Still another object of the invention is to provide a novel and improved conveyer structure employing removable material supporting poles with a novel means associated with the conveyer for automatically removing such poles from the conveyer as the links of pole supporting runs of the conveyer chains pass a predetermined point.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:—

Fig. 1 is a view illustrating diagrammatically a side elevation of a dryer showing the conveyer structure embodying the present invention in association therewith.

Fig. 2 is a view in end elevation of the structure as illustrated in Fig. 1.

Fig. 3 is a view looking down upon a group of links making up one of the chains of the conveyer.

Fig. 4 is a view in side elevation of the links as shown in Fig. 3, with one of the pivot pins in section.

Fig. 5 is a section on the line 5—5 of Fig. 1.

Fig. 6 is a detail illustrating one of the rod catching hooks.

Referring now more particularly to the drawings, there is illustrated in Fig. 1, a conveyer structure showing the manner of using the novel chain embodying the present invention and also illustrating the novel means employed for removing material carrying poles or bars from the conveyer which is made up of two or more endless chains of the type hereinafter described. In this figure, the numeral 1 generally designates a chambered structure in the nature of a dryer such as is used for the drying of skein material or the like. No details of construction of this dryer are illustrated as such dryer forms no part of the present invention and the same may be of any standard or well-known form which has suitable openings at opposite ends for the passage of a conveyer unit therethrough.

The conveyer unit embodying the present invention is made up of two endless chains, each of which is generally designated by the numeral 2 and at one end of the dryer structure 1, there is rotatably mounted a shaft 3 carrying a pair of toothed or sprocket wheels 4 about each of which one of the endless chains passes. At the opposite end of the dryer is a similar rotatably mounted shaft 5 carrying a pair of sprocket wheels 6 and each of these sprocket wheels has the top run of an endless chain passed thereover and then directed downwardly to pass to a sprocket wheel 7 supported upon a shaft 8 which is disposed at an elevation below the dryer 1, preferably in practice, adjacent a floor below the floor 9 upon which the dryer is supported. A suitable opening 10 is formed through the floor 9 to permit the downwardly extending end of the conveyer structure to pass to the floor below as illustrated.

In order that the lower run of the conveyer, or the lower runs of the endless chains of which the conveyer is made up, may be made to maintain horizontal position within the dryer 1 in parallel relation with the upper run of the conveyer, the inner walls of the dryer are provided adjacent the ends thereof nearest the shaft 5, with the angular supporting brackets 11, each of which has a lower part 12 which is secured in a suitable manner to the adjacent side wall of the conveyer, and an upper laterally directed portion 13 which carries the two vertical spaced ears 14, and these brackets support short track bars 15, each of which bars has a downwardly curved outer end 16 over which the lower run of the adjacent conveyer chain is guided to pass down to the adjacent sprocket wheel 7.

Each of the conveyer chains forming a part of the present invention is made up of a series of interconnected links generally designated by the numeral 17 and each of these links includes the pair of spaced parallel side or link plates 18 of novel form as hereinafter specifically described.

Each link plate comprises an elongated flat body of material having the head ends 19 joined by an intermediate constricted portion 20 and formed integral with each of the head ends 19 at one side edge thereof, is the obliquely directed integral bill 21 which extends in the general direction of the opposite head across the constricted intermediate portion 20 of the plate to form a pole end receiving recess 22. These bills 21 are not only at opposite ends of the plate 18 but at opposite side edges thereof so that when the chain is assembled as hereinafter described and the link plates are arranged in a horizontal run of the chain, one of the bills thereof will be directed upwardly and the other or opposite bill will be directed downwardly with the recesses 22 facing in opposite directions.

At the central part of each head of each link plate there is formed an aperture 23 for the reception of a pivot bolt or pin 24. When the chain is set up, two of the plates 18 will be in side by side relation to form a link and will have their ends in overlapping relation with the ends of two plates of an adjacent link so that each bolt will pass through four link plates, as shown in Figs. 3 and 5, and there will be supported upon each bolt between the inner two plates through which it passes, the roller 25 which serves the two-fold purpose of maintaining the link plates in the proper spaced relation and also providing a bearing for engagement with the sprocket wheels and the rounded end of the supporting track 15, so that the movement of the endless chain over the wheels and track will be relatively smooth and friction will be reduced to a minimum.

In the set up conveyer structure two chains will be employed as illustrated, and these chains will move in the direction which the bills of the plates of the top runs extend, thus, as shown in Fig. 1, the top run of the conveyer or the top runs of the chains of which the conveyer is made up, will move from left to right through the dryer and the bottom or return runs pass from right to left and turn downwardly over the downturned ends of the guide tracks 15 to the lower supporting sprocket wheels 7. In the use of this conveyer for passing material such as yarn skeins through the dryer structure, there are employed bars or poles 26 which are placed transversely of the top runs of the conveyer chains in the upwardly moving portion of the conveyer which is generally designated by the numeral 27 so that the ends of the rods rest in the upwardly directed recesses or sockets 22 of plates of transversely spaced links 17. It will be seen that the skein carrying poles will then be moved up and over the wheels 6 and pass horizontally through the dryer to the opposite wheels 4. Here they will be removed by an attendant and after the attendant has removed the skeins from the poles, they will be replaced upon the conveyer by being inserted between the runs thereof so as to have their ends disposed in the recesses 22 of the top edges of the link plates so that the poles will pass back through the conveyer on the lower run thereof and downwardly with the downwardly moving part of the lower run of the conveyer which is generally indicated by the numeral 28.

Disposed between the two runs of the conveyer structure and extending transversely thereof near the lower ends of the portions 27 and 28, is a fixed shaft 29 which carries two or more hanging hooks 30 which has a downwardly extending vertical portion 31 and the obliquely directed bill portion 32. These hooks are spaced to lie in the area between the endless chains of the conveyer and are so positioned that the ends of the bill portions 22 will extend across the plane in which the adjacent lower runs of the conveyer chains lie. Thus it will be seen that as the returning poles or rods 26 move downwardly with the portion 28 of the conveyer structure, they will be picked off of the conveyer by the hooks 30 and will slip down over the hook bills 32 to be retained by the hooks until desired for further use.

From the foregoing, it will be readily apparent that with the novel chain construction herein disclosed, material carrying bars or poles may be conveniently passed in one direction through a dryer or other structure and returned by the same conveyer to the starting point and automatically removed from the conveyer until desired for further use, thus requiring the attendance of only two persons who can work without having to leave their stations at the ends of the conveyer structure.

What is claimed is:

1. In apparatus of the character described, an endless conveyer comprising a pair of spaced parallel endless chains made up of a plurality of pivotally connected links, means forming a part of each of said links adapted to receive the ends of a material carrying pole disposed transversely of the conveyer whereby such pole may be carried in either of two directions upon the upper and lower runs of the conveyer, the said conveyer having a horizontally disposed portion and a downwardly directed terminal portion and the said means operating to maintain the pole transversely of the conveyer when carried either upon the upwardly moving run or the downwardly moving run of the conveyer, and means adjacent the downwardly moving under run of the conveyer for engaging and lifting the pole carried thereby from the said first means.

2. In apparatus of the character described, an endless conveyer consisting of a pair of spaced parallel endless link chains, said conveyer having a horizontally disposed portion and an obliquely directed portion, supporting means for the ends of the conveyer and intermediate the ends for maintaining the upper and lower runs of the said portion substantially in parallel relation, said chains having links therein provided with recesses which open upwardly and downwardly with respect to the runs of the chains, said recesses being designed to facilitate the positive engagement between transversely spaced links upon the upper or lower runs of the two chains of a material supporting pole, and means disposed between the runs of the chains of the obliquely directed portion of the conveyer for engaging and removing the said pole from the supporting links of one of the runs of the conveyer.

3. A material supporting pole transporting apparatus, comprising an endless conveyer consisting of a pair of spaced parallel endless link chains, supporting means for said chains whereby the same may move in spaced parallel runs, and said chains having links therein formed at opposite edges with oppositely directed fingers coacting with the adjacent link edges to form oppositely directed pole end receiving recesses whereby said poles may be positively engaged and held in transverse position on the conveyer by either of the runs of the conveyer to be transported thereby in either of the two directions of movement thereof.

4. In an endless conveyer chain structure of the character stated, a chain link comprising a pair of spaced parallel plates, means connecting and maintaining said plates in said parallel relation, and means upon two opposite edges of the link facilitating the support of a bar-like body upon and transversely of the link on either of two vertically moving runs of an endless chain structure of which the link forms a part, comprising recesses formed in opposite edges of a plate of the link and extending obliquely to the length thereof.

5. In an endless conveyer chain structure of the character stated, a chain link comprising a pair of spaced parallel plates, means connecting and maintaining said plates in said parallel relation, and means facilitating the support of a bar-like body upon and transversely of the link on either side of two vertically moving runs of an endless chain structure of which the link forms a part, comprising bill members extending in opposite directions obliquely from a plate of the link, from opposite edges and opposite ends thereof, forming receiving recesses for said pole-like body.

6. In an endless conveyer chain structure designed for transportation of pole-like bodies, a link consisting of two elongated spaced parallel plates, a pivotal connection between the adjacent ends of said plates, a spacer unit between the said adjacent ends of the plates and supported upon said connection, and means for supporting an end of a bar transversely of said link on either of two vertically moving runs of an endless chain structure of which the link forms a part, comprising recesses formed in opposite edges of the link plates and opening in a direction obliquely to the length of the plates and in opposite directions with respect to one another.

7. In an endless conveyer chain structure designed for transportation of pole-like bodies, a link consisting of two elongated spaced parallel plates, a pivotal connection between the adjacent ends of said plates, a spacer unit between the said adjacent ends of the plates and supported upon said connection, and means for supporting an end of a bar transversely of said link on either of two vertically moving runs of an endless chain structure of which the link forms a part, comprising a bill formed integral with each longitudinal edge of each plate and extending obliquely with respect to the length of the plate, the bills of each plate originating adjacent opposite ends of the plate and being oppositely directed with respect to one another and the said bills of each plate being parallel with those of the other plate.

RICHARD W. HALL.